(12) United States Patent
Weber et al.

(10) Patent No.: US 11,394,102 B2
(45) Date of Patent: Jul. 19, 2022

(54) ANTENNA HOUSING AND STRUCTURE FOR ANTENNA HOUSING

(71) Applicant: Telefonaktiebolaget LM Ericsson (publ), Stockholm (SE)

(72) Inventors: Stefan Weber, Söchtenau (DE); Eckart Stuible, Brannenburg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 16/971,888

(22) PCT Filed: Aug. 21, 2018

(86) PCT No.: PCT/DE2018/100727
§ 371 (c)(1),
(2) Date: Aug. 21, 2020

(87) PCT Pub. No.: WO2019/161818
PCT Pub. Date: Aug. 29, 2019

(65) Prior Publication Data
US 2021/0091449 A1 Mar. 25, 2021

(30) Foreign Application Priority Data
Feb. 23, 2018 (DE) .................... 10 2018 104 216.7

(51) Int. Cl.
*H01Q 1/42* (2006.01)
*H01Q 1/00* (2006.01)
*B64C 21/10* (2006.01)
*F15D 1/12* (2006.01)
*H01Q 1/24* (2006.01)

(52) U.S. Cl.
CPC ............. *H01Q 1/005* (2013.01); *B64C 21/10* (2013.01); *F15D 1/12* (2013.01); *H01Q 1/246* (2013.01); *H01Q 1/42* (2013.01)

(58) Field of Classification Search
CPC .......... H01Q 1/005; H01Q 1/246; H01Q 1/42
See application file for complete search history.

(56) References Cited

U.S. PATENT DOCUMENTS

2005/0163963 A1   7/2005   Munro et al.
2016/0248151 A1   8/2016   Proshold et al.

FOREIGN PATENT DOCUMENTS

DE   202009001821 U1   4/2009
JP   2001050215 A   2/2001
WO   WO-2018009383 A1 *   1/2018   ............. H01Q 19/19

OTHER PUBLICATIONS

International Search Report and Written Opinion of the International Searching Authority, PCT/DE2018/100727, dated Nov. 16, 2018, 13 pages (including English translation).
Air Store, "Turbulator Tapes," web.archive.org, Sep. 6, 2016, retrieved from the Internet: http://air-store.eu/tape/turbulator-tapes (retrieve on Nov. 6, 2018), 2 pages.

* cited by examiner

*Primary Examiner* — Hoang V Nguyen
(74) *Attorney, Agent, or Firm* — Sage Patent Group (57) ABSTRACT

An antenna housing includes, in at least one region which, after the antenna housing is mounted, is exposed to an incident flow from an air stream, a structure formed such that it transfers the incident air stream and the air stream present at the housing into a turbulent flow at a transfer region defined by the structure A corresponding structure is also disclosed.

9 Claims, 6 Drawing Sheets

ANTENNA HOUSING AND STRUCTURE FOR ANTENNA HOUSING

CROSS REFERENCE TO RELATED APPLICATIONS

This application is a 35 U.S.C. § 371 national stage application of PCT International Application No. PCT/DE2018/100727 filed on Aug. 21, 2018, which in turns claims foreign priority to German Patent Application No. 10 2018 104 216.7 filed on Feb. 23, 2018, the disclosures and content of which are incorporated by reference herein in their entirety.

The invention relates to an antenna housing and a structure for antenna housings.

In the field of mobile communication antennas, the need to transmit large amounts of data is increasing. The antennas for this are becoming more and more complex and require more space despite high integration density. Since the antennas are usually mounted on a mast, it is not only when replacing antennas that the wind load acting on the antennas and thus the mast can become problematic. Therefore, it is becoming increasingly important to provide antennas, especially their antenna housings, which contribute to reducing the wind load.

Therefore, it is an object of the invention to provide an antenna housing and a structure for antenna housings which serves to reduce wind load while at the same time provides optimal transmission characteristics of the RF technology.

According to the invention, this object is solved by the features of the independent patent claims. Advantageous embodiments are part of the dependent claims.

The invention relates to an antenna housing having, in at least one region which, after the antenna housing is mounted, is exposed to an incident flow from an air stream, a structure formed such that it transfers the incident air stream and the air stream present at the housing into a turbulent flow at a transfer region defined by the structure. The invention further relates to a corresponding structure.

Thus a reduction of a wind load present on the housing is achieved compared to the same antenna housing without structure. The reduction can be measured e.g. in a wind tunnel. Due to the transition of an essentially laminar air stream into turbulent flow at a point exactly defined by the structure, the effect can be used that a turbulent flow has a much stronger tendency to attach itself to strongly curved or diverging surfaces and not to break off. This means that ideally there is no or only a small or flatter dead water area along the flow around the antenna housing, i.e. the low-resistance, adjacent flow around the antenna housing is longer in contact with the housing and is later detached. This reduces the air resistance and thus the wind load on the antenna housing and thus on the entire antenna caused by the air stream. The intensity of the asymmetrical vortex shedding is reduced by the transition points or lines defined by the structure, which is also triggered by a "boundary layer bubble" jumping back and forth. The asymmetric vortex shedding leads to a vibration load of the antenna and the masts, in a frequency dependent on the wind speed, among other things, which may stimulate undesired resonance phenomena of the structures.

The precisely defined location or area where the transition takes place is determined by a person skilled in the art depending on the type and shape of the antenna housing and the type, shape and configuration of the structure. The transition on the structure from the air stream adjacent to the antenna housing to a turbulent air stream at the respective measured wind speeds is called transition.

Furthermore, it is standard practice to measure a wind load applied to a body, e.g. in a wind tunnel, using appropriate tools. In this case the wind load is measured at the same location or area at different speeds, so that a corresponding measurement curve of the wind load for different wind speeds is generated. Thus a comparison between the wind load applied to the antenna housing with and without structure at different wind speeds can be made to obtain a direct comparison. Thus, the comparison is not made by comparing a measured value of the wind load with a preceding measured value of the antenna housing with the structure, but by comparing it with a measured value on the antenna housing without structure with the same wind speed, advantageously at a predetermined reference value of the wind speed.

Of course, the measurement is carried out under the same environmental conditions in order to establish comparability. For this purpose, the wind tunnel is the best choice, as no additional external influences are involved, thus ensuring a very good comparability of the measurements.

In one embodiment, the structure is formed in such a way that the reduction of the wind load is measurable at least at a given reference value, which is a given wind speed. The reference value, at which the wind load of the antenna housing is determined on the basis of e.g. legal, internal or other specified requirements, is used to compare the properties of antenna housings between manufacturers.

The structures for reducing the wind load arranged on the antenna housing are advantageously formed in such a way that they enable a reduction of the wind load by at least 2% within a predetermined range of wind speeds at a predetermined reference value compared to an antenna housing without structure. The range in which a reduction of the speed v of the air stream compared to the antenna housing without structure can be measured is advantageously at least within 40 km/h≤v≤300 km/h, or 70 km/h≤v≤300 km/h, or 100 km/h≤v≤300 km/h, or 150 km/h≤v≤300 km/h.

In one embodiment, the structure is located at an area on the antenna housing where the impinging air stream is about to break off. This area can also be selected depending on the antenna housing and the structure used and can be determined e.g. by measurements in a wind tunnel. As an area where the air stream is just before the break-off, an area is designated where the air stream on the antenna housing without structure does not yet break off. The structure should be located near this area, e.g. within a few centimeters or millimeters. The distance to the area where the air stream breaks off also depends on the type of structure, e.g. its height, width, length, shape, etc., as well as the desired effect that the structure should achieve. The structure then causes the transition into the turbulent flow. Due to the very high number of possibilities of the shape of the antenna housing and the structure and the resulting combinations, it is not possible to give an exact location for the arrangement of the structure here. Instead, the area where the flow breaks off must be determined individually for each housing shape, e.g. by means of test series in the wind tunnel.

It is advantageous that the flow pattern can be made visible by simple means, so that a simple visual confirmation can be made that the dead water area is larger without structure than with the structure. This can be done, for example, by holding a string in the wind tunnel from a position in the wind direction towards the antenna or antenna housing. The string is used to make the flow visible. If a structure is present, it can be clearly seen that the dead water area becomes smaller compared to a non-existing structure on the antenna or the housing. From this it can then be seen in corresponding measurements that the wind load is reduced.

In one embodiment, the structure is formed as a turbulator or micro-turbulator or a combination of both. In a further embodiment, the following structures are used as turbulators, individually or in combination: a zigzag band, a knob band, a step, a step with a knob band on top, individually mounted knobs, individually mounted elevations, vortex generators, one or more adjacent abrupt and sharp-edged elevations with associated edges, the edges pointing in one direction or in several directions at an angle to one another. By using defined disturbance structures, the effect of wind load reduction can be adjusted to the application area for the antenna.

In one embodiment, the structure is a structure that is additively applied to the antenna housing or incorporated into the antenna housing. If the structure is formed directly in the manufacturing process of the antenna housing or afterwards by a mechanical or chemical process, an assembly step can be saved. If the structure is added to the antenna housing, it can be used to retrofit existing antenna housings. This saves high costs for replacement.

In one embodiment, the antenna housing mainly has the shape of a cuboid with a front, first and second side walls, rear, lid and bottom, and edges between them with a predetermined edge radius. The structure is located adjacent to or on an edge between two sides and/or between one side and lid and/or between one side and bottom of the cuboid. Advantageously, the structure is formed and arranged as a continuation of the edge radius of the edge on which it is arranged. This creates a flush transition on the lee side, i.e. the side facing away from the air stream, the edge and a break-off edge on the windward side, i.e. the side facing the air stream.

In another embodiment, the antenna housing basically has the shape of a cuboid with front, first and second side walls, rear, lid and bottom and edges between them with a predetermined edge radius. The structure is located in an area spaced from an edge between two sides or one side and the lid or bottom. In an embodiment, the structure is straight or undulating or curved continuously or at least once interrupted over all or a predetermined length of the area where it is located. In one embodiment, the structure is rectilinear or wave-shaped or arcuate along an edge of the antenna housing.

By appropriate arrangement of the structure, e.g. also of several structures, at different areas and in different ways, e.g. rectilinear or wave-shaped or arcuate continuous or interrupted and/or at different angles to each other, the effect of wind load reduction can be improved and adapted to the area of application for the antenna.

Furthermore, a structure is provided for arrangement on an antenna housing, which is formed in such a way that it can be applied afterwards, in particular glued, to the antenna housing, and converts an air stream impinging on the antenna housing and abutting the housing into a turbulent flow at a transition area defined by the structure. Thus, a reduction of a wind load applied to the housing compared to the same antenna housing without structure is achievable and thus also measurable e.g. in a wind tunnel.

The structure is advantageously formed as a turbulator or as a micro-turbulator or a combination thereof and wherein the turbulator comprises at least: a zigzag band, a knob band, a step, a step with a knob band on top, individually mounted knobs, individually mounted elevations, vortex generators, one or more adjacent, abrupt and sharp-edged elevations with associated edges, wherein the edges point in one direction or in several directions at an angle to each other.

By providing the structure, existing antennas can be retrofitted, thus saving the cost for replacing the entire antenna.

Further features and advantages of the invention are given in the following description of embodiments of the invention, by means of the figures of the drawing showing inventive details, and in the claims. The individual features can be realized individually or in any combination in a variant of the invention. Preferred embodiments of the invention are explained in more detail below on the basis of the attached drawing.

In the following figure descriptions, identical elements or functions are labelled with identical reference signs.

The following description focuses on mobile communication antennas, which are usually mounted on a relatively free-standing mast, since this is where the highest wind loads can be expected. However, the embodiments described below can also be used for antennas located at other locations, including those not used for mobile communication, even for movable antennas. Antenna housings which surround the actual antenna, i.e. especially the radome, are usually shaped in such a way that the shape of the antenna housing is adapted to the electrical properties of the antenna. However, since the antenna housing surrounds the antenna, i.e. is exposed to the environmental influences, it is also necessary to design the antenna housing in such a way that the wind load is reduced.

In the following, the invention is described on the basis of antenna housings which have approximately the shape of a cuboid. Other shapes are also possible if the structure described below is adapted accordingly to reduce the wind load acting on the antenna housing.

An antenna housing 100 described below has a front wall 101, two side walls, a bottom, a lid 102 and a rear wall. Antenna housings 100 attached to a mast are usually attached to it with their rear wall, so that especially their front side 101 is exposed to the impinging air stream, e.g. wind. If the antenna housing 100 is attached to the mast at an angle, other parts of it, e.g. the lid 102 and/or one of the side walls, are also exposed to a wind load caused by an impinging air stream.

The wind load can be problematic if the mast is not designed for it. This can occur when old antennas are replaced by newer generation antennas, which become larger and heavier due to the increasingly complex requirements and the need for high data rates and thus additionally required components. Due to the increasing size they are also exposed to higher wind loads, as the air resistance is increased by the larger front of the front side 101 alone. In addition, the effect can be observed that at the edges, e.g. from front side 101 to one of the side walls, an abrupt stall occurs even with rounded edges, which leads to increased air resistance and thus to higher wind load due to the dead water behind the edge. In case of frontal incident flow, currently known profiles often cause a stall at the side edges. This means that the airflow cannot follow the profile and stalls. The smaller the edge radius, the sooner the flow breaks off. The stall leads to a significant dead water area, which has a larger cross-section than the antenna. This cross section is relevant for the air resistance. The earlier and sharper the stall occurs, the larger the dead water area and thus the air resistance, as shown schematically in FIG. 2a.

In fluid mechanics, dead water is understood to be an area in which a flow existing in the vortex zone of a body around which air is flowing, for example, runs in the opposite direction to the main flow direction, so that undesirable effects such as increased air resistance are usually generated here. A body that is exposed to a flow generally experiences resistance. This resistance can be divided into individual components that have different causes. With blunt bodies (e.g. cuboids) this is mainly the flow resistance. This is a combination of frictional resistance and pressure resistance. The dead water is essentially responsible for the flow resistance. The other types of resistance due to surface friction, interference resistance and induced resistance play a minor role in the aerodynamics of blunt bodies.

Wind load is the pressure or suction acting on an object due to wind acting on the object. This leads to a pressure load on the object per unit area.

Depending on the shape and surface of the contour being flown against, sooner or later the flow will naturally break off and, depending on the shape, a change from laminar to turbulent flow will take place. Transitions from laminar to turbulent flow are incoherent processes, i.e. they depend on the direction of the flow and on the change of the direction of the flow. Furthermore, the transition from laminar to turbulent flow is locally unstable, i.e. depending on the periodically alternating vortex shedding, the point of the flow transition from laminar to turbulent changes (more precisely, it is an area where a small bubble forms).

Figure 1:
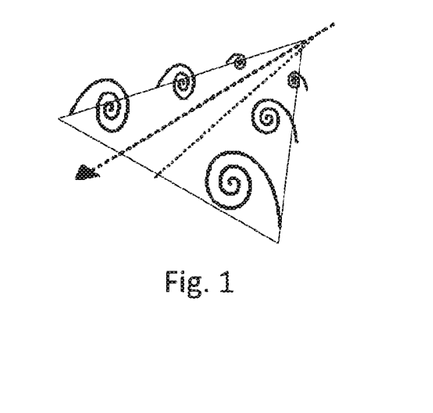
FIG. 1 shows a vortex image of V-shaped vortex generators.

Measures to influence the aerodynamics of slender, flow-around bodies such as a wing are known from the aircraft sector or wind turbines. For example, on leading edges of gliders, but also up to passenger planes, disturbing structures or turbulators are arranged, which are e.g. called vortex generators. These are used to influence the uplift, detachment and break-off behaviour of air streams in a controlled manner by triggering the transition area or point from laminar to turbulent flow, thus leading to a less resistant flow around the air stream and thus to flow optimisation. Energy is fed into the turbulent flow in a controlled manner by creating small wake vortices through the turbulators. Vortices are energy-rich. The higher the energy in the turbulent flow, the longer it stays in contact with the profile and does not break off. V-shaped vortex generators produce a vortex pattern similar to that shown in FIG. 1. In contrast to slender bodies, blunt bodies such as antennas or antenna housings clearly have different, non-comparable aerodynamic properties, so that a transfer of measures such as applying a structure leads to completely different effects. For this reason, structures and their arrangement must be completely reexamined for use in the antenna area.

Figure 2A:
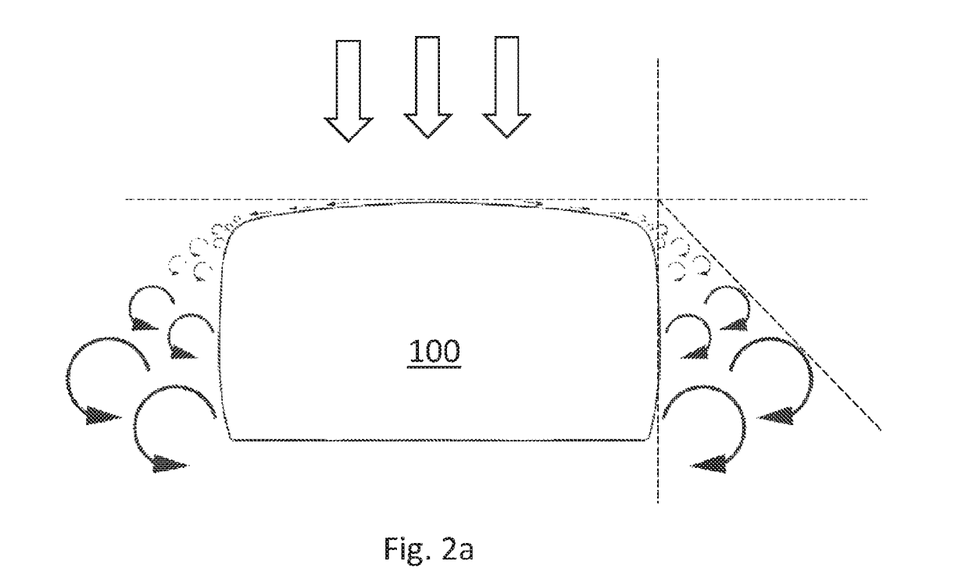
FIG. 2a shows a schematic view of the flow around an antenna housing without inventive structure 10 in a frontal air stream.

With regard to antenna housings, it is important that the defined flow transition from laminar to turbulent flow takes place in as large a range as possible of the direction of inflow to the antenna housing 100. An advantage of the V-shaped vortex generators in contrast to a linear edge without jags, as e.g. shown in FIG. 2a, is that the triggering edge for the flow transition takes place over a larger range of the edge radius.

Figure 12:
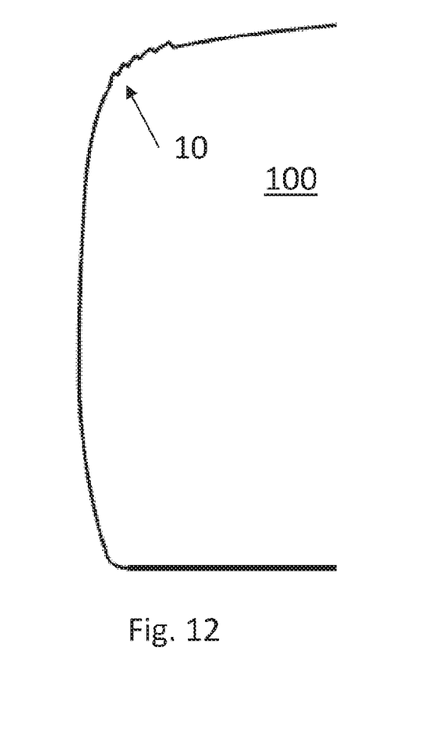
FIG. 12 shows a schematic view of an antenna housing with a stepped structure arranged thereon according to a further embodiment of the present invention.

Alternatively, the structure can be formed as a stepped structure 10, i.e. with several linearly distributed edges on the radius, as shown in FIG. 12. Thus, for each direction of inflow there is one edge for the flow transition. Stepped structures are, for example, a sawtooth shape, a shape with conical, truncated cone, rectangular or similar forms, which have a corresponding elevation.

Figure 13:
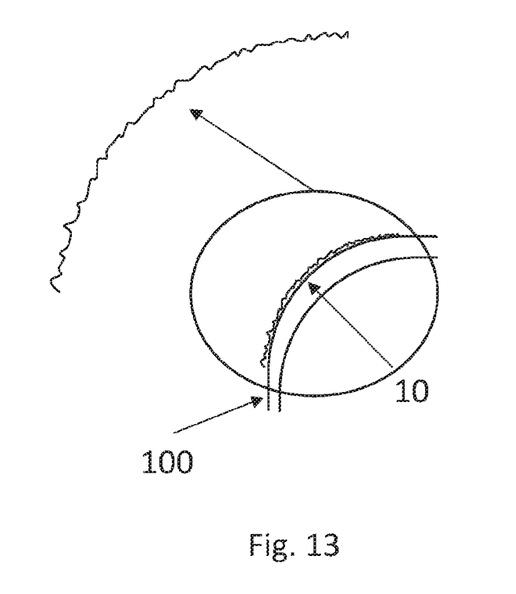
FIG. 13 shows a schematic view of an antenna housing with a microturbulator structure arranged thereon and an enlargement thereof, according to a further embodiment of the present invention.

This could be done in a simple embodiment by using a microturbulator structure, as shown in FIG. 13. Such a structure 10 could be a sandpaper structure. This has coarse grains distributed along the radius, which cause the boundary layer to change.

Figure 2B:
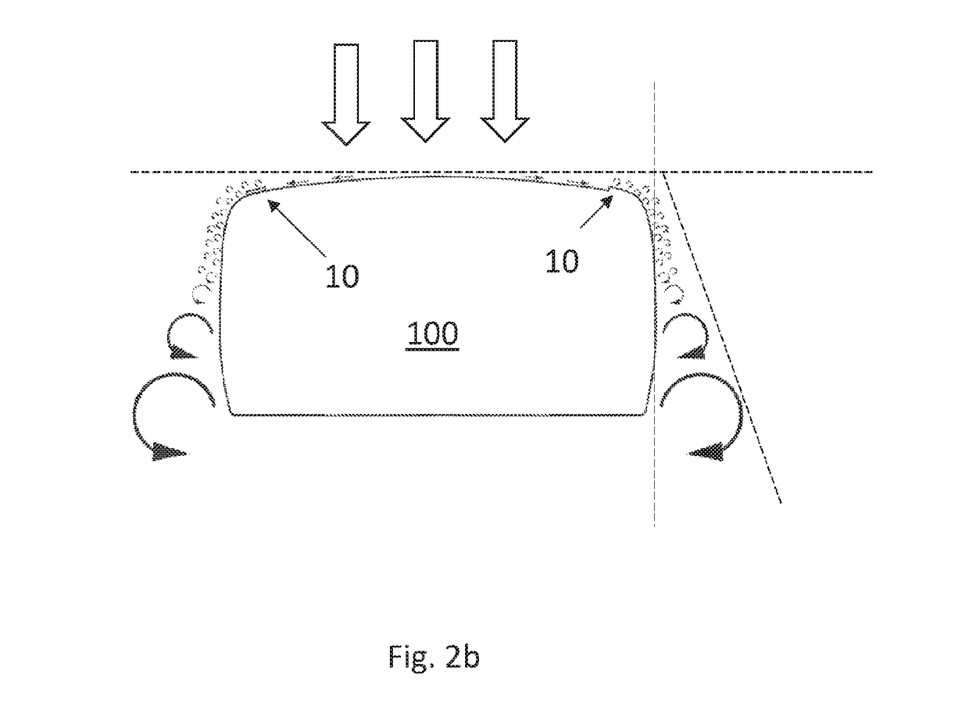
FIG. 2b shows a schematic view of the flow around an antenna housing with two different structures 10 according to the invention in frontal flow according to further embodiments of the present invention.
Figure 3:
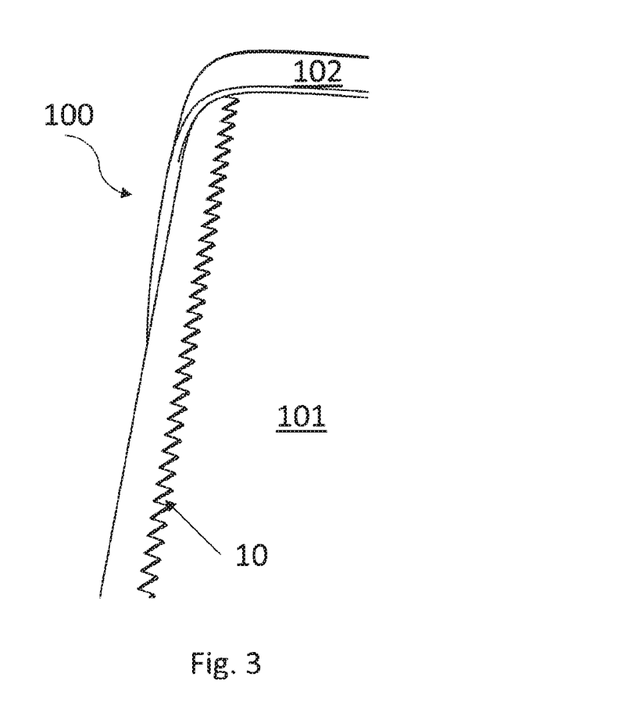
FIG. 3 shows a schematic view of an antenna housing with a structure incorporated therein according to an embodiment of the present invention.

The problem of wind load reduction is solved by the structures 10 described below, which are additively arranged on the antenna housing 100, as shown in FIGS. 4 to 9, or which are introduced into the antenna housing 100 directly during manufacture or subsequently by a mechanical or chemical process, as shown in FIG. 3. The result of using the structures 10 described below is shown schematically in FIG. 2b.

In the comparison between FIG. 2a and FIG. 2b the difference in the flow around the antenna housing 100 is clearly visible. In both figures the incident flow is indicated by several arrows hitting the antenna housing 100 essentially perpendicularly. To the left and right along the antenna housing 100 the resulting detachment of the flow or the area of transition from laminar to turbulent flow (FIG. 2b) is shown.

In FIG. 2a there is no inventive structure 10 on the antenna housing 100. In this case, the incident flow of air stream entering the antenna housing (as straight running arrows at the top of the antenna housing 100) cannot follow the corner radius of the antenna housing 100 and breaks off early at the corner of the antenna housing 100 (curved running arrows). This creates a large dead water area which creates a high resistance.

FIG. 2b shows two different inventive structures 10, in the picture above left as a mounted turbulator and above right as a turbulator stage integrated into the antenna housing 100. The incident flow becomes turbulent—because forced—before the natural break-off point and at a defined point as shown by the small, curved arrows. This turbulent flow follows the profile contour better than a flow without structure 10, as shown in FIG. 2a, and only breaks off completely from the antenna housing 100 much later. This results in a smaller dead water area, i.e. a lower flow resistance.

Dotted lines are shown to illustrate the difference in size of the dead water area between the embodiments shown in FIGS. 2a and 2b. It can be clearly seen that in FIG. 2b the dead water area, i.e. the area between the lines forming an angle (one of which is parallel to the direction of inflow, the other marks the boundary from laminar to turbulent flow) is smaller than in FIG. 2a. Thus, the wind load is also lower, which can be measured. In experiments, e.g. in a wind tunnel, the dotted line on the outer right-hand side of both figures could be called the boundary line. Here, a string from a laminar one lying in the flow (to the left of the dotted line when viewing FIGS. 2a and 2b) would change turbulently moving (to the right of the dotted line when viewing FIGS. 2a and 2b).

By using the structures 10 described below, the effect is physically exploited that an ideally laminar flow, here in particular an air stream, can be transformed into a turbulent flow by hitting a certain structure in a controlled manner at predetermined points or areas, hereinafter also referred to as the transition area. The flow can also be only essentially laminar, i.e. it can also have turbulent components. The exact position and realization of the structure 10, e.g. height and width or the extension and length of the structure 10, depend among other things on the shape of the antenna housing 100 and the radius of the edges between two surfaces of the antenna housing 100, e.g. between front 101 and a side wall. Likewise, the exact location where the flow transitions, i.e. the transition area, depends on the shape of the structure 10 and the antenna housing 100. The transition area can also be a defined transition point. It is essential that the impinging, essentially laminar air stream has transformed into a turbulent flow after passing through the structure 10 and due to the passage through the structure 10.

It is advantageous that the structures are arranged and formed in such a way that a transition from laminar to turbulent flow of the impinging air stream occurs over a given speed range, if possible, depending on the standard or specification (e.g. DIN 1055, TIAA222G). The structures arranged on the antenna housing to reduce the wind load are advantageously formed in such a way that they enable a reduction of the wind load within a specified range of wind speeds compared to an antenna housing without structure, e.g. according to DIN 1055 a range of 0 to 150 km/h and for TIAA222G a range of up to 150 mph (miles per hour), which corresponds to approximately 241 km/h, is required. The range in which a reduction of the speed v of the air stream compared to the antenna housing without structure can be measured is advantageously at least within 40 km/h≤v≤300 km/h, or 70 km/h≤v≤300 km/h, or 100 km/h≤v≤300 km/h, or 150 km/h≤v≤300 km/h. The upper range depends on the application and can reach up to the maximum possible wind speeds in the stationary and mobile area, so it can also be more than 300 km/h in the future.

In the following, an exemplary antenna housing 100 in the form of a cuboid with a relatively small edge radius of approx. 20-30 mm is considered. For other shapes the structure 10 should be adapted accordingly, which is possible by simulation or tests in a wind tunnel.

FIGS. 3-12 show embodiments which differ only in that FIGS. 3 and 12 show a structure 10 introduced, for example, directly during the manufacture of the antenna housing 100, and FIGS. 4 to 11 each show one or more structures 10 additively arranged on the finished antenna housing 100 in different versions but with the same effect.

Figure 6:
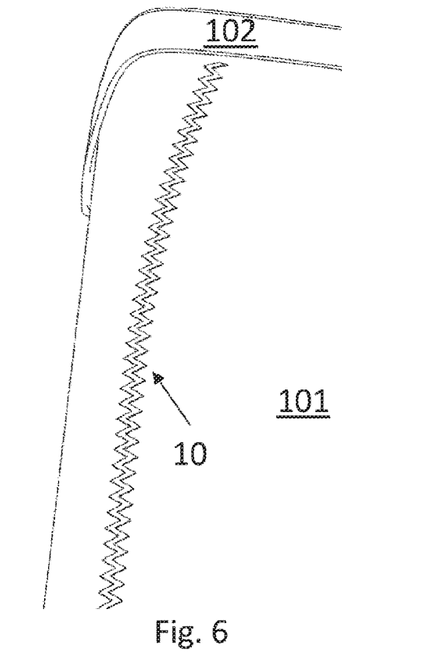
FIG. 6 shows a schematic view of a structure bent towards the lid according to a further embodiment of the present invention.
Figure 7:
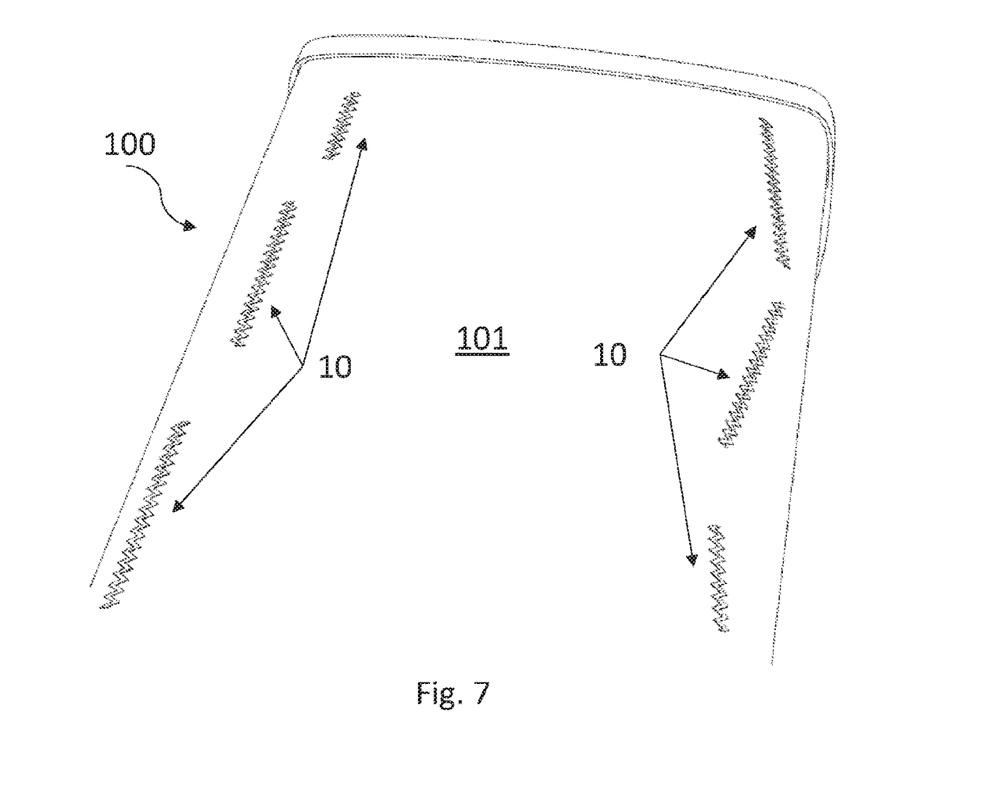
FIG. 7 shows a schematic view of several interrupted structures arranged at different positions on the antenna housing according to a further embodiment of the present invention.
Figure 11:
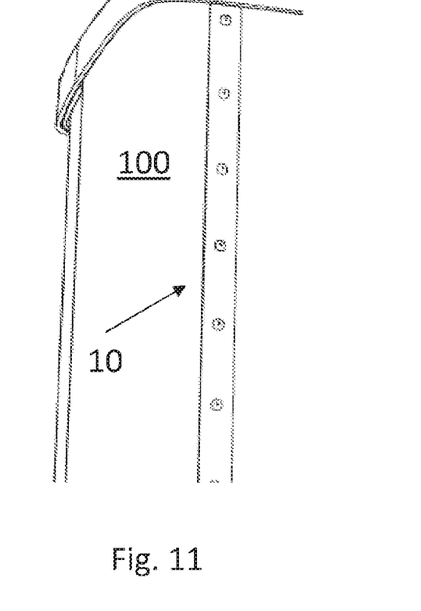
FIG. 11 shows a schematic view of an antenna housing with a structure arranged thereon in the form of a knob band according to a further embodiment of the present invention.

The structure 10 shown in FIG. 6 differs from the structures 10 shown in the other figures in that it has an arc towards the inner part of the front 101 at the end which runs towards the lid 102. FIG. 9 shows an embodiment with several structures 10 arranged at different areas of the antenna housing 100. One of the structures 10 is located directly on an edge between front 101 and a side wall, while two other structures 10 are located quite centrally in the side wall and front 101 respectively. Another structure is located near the edge. Shown here are jagged structures 10. Knob bands, as shown in FIG. 11, or vortex generators, as shown in FIG. 4, or a turbulator stage, as shown in FIG. 8, or multi-stage turbulators, as shown in FIG. 12, can also be used.

In general, structure 10 is formed as a turbulator or micro-turbulator. Turbulators can be divided into two groups, also called 2D and 3D turbulators. The term 2D means that the structure only extends in two directions, whereas the 3D structure also extends in another direction.

Figure 4:
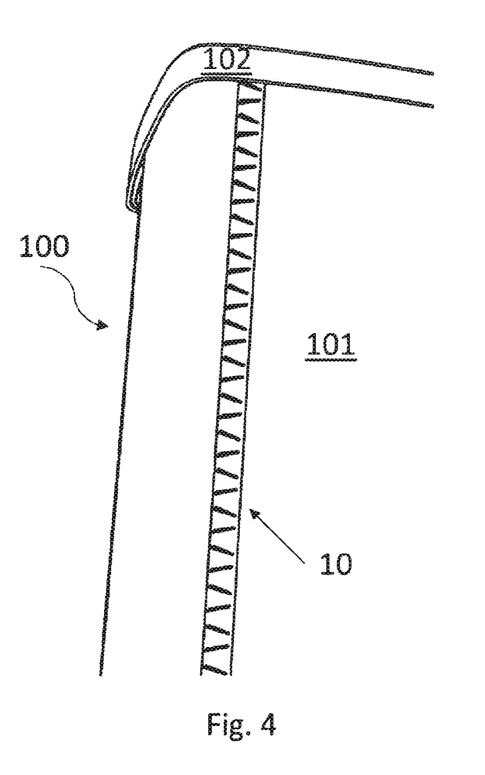
FIG. 4 shows a schematic view of an antenna housing with a structure arranged thereon, more precisely complex vortex elements, according to a further embodiment of the present invention.
Figure 5:
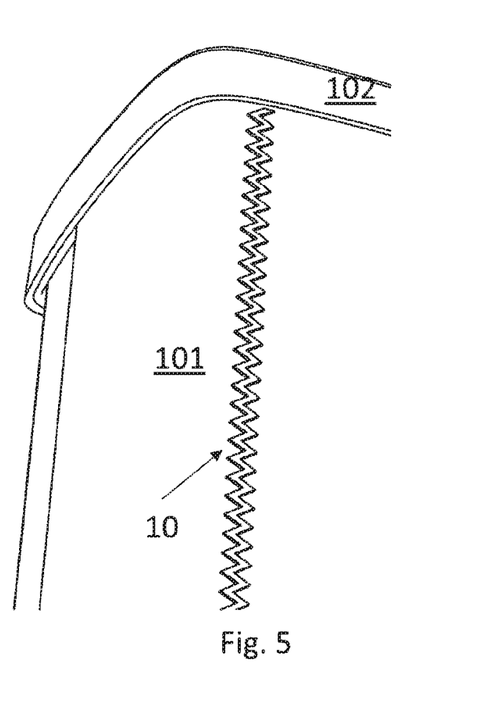
FIG. 5 shows a schematic view of an antenna housing with a structure arranged thereon as a 3D turbulator zigzag shape according to another embodiment of the present invention.
Figure 8:
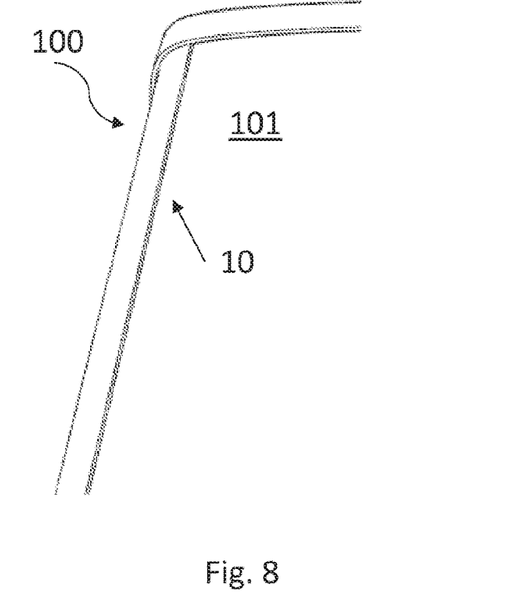
FIG. 8 shows a schematic view of a structure in the form of a 2D turbulator incorporated in the antenna housing according to a further embodiment of the present invention.
Figure 9:
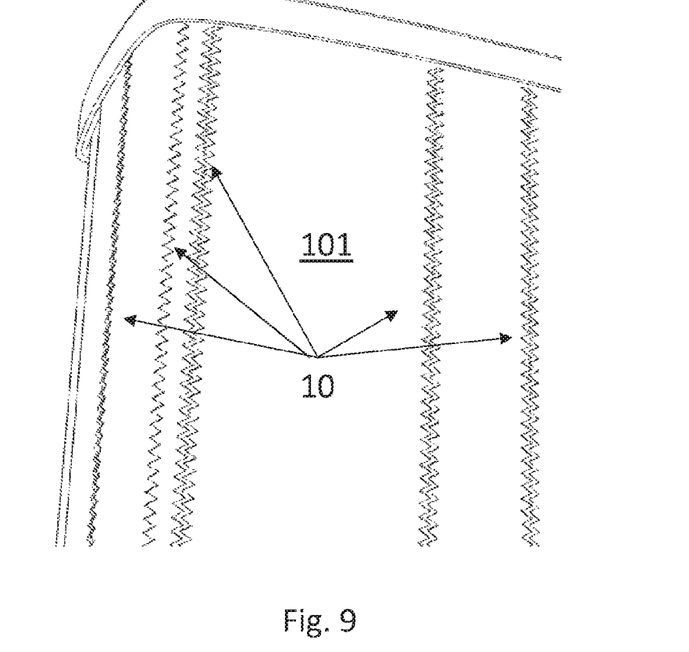
FIG. 9 shows a schematic view of an antenna housing with several structures arranged at different areas according to a further embodiment of the present invention.

For example, a 2D turbulator is a stage as shown in FIG. 8. 3D-turbulators are e.g. a zigzag band (FIG. 3, 5, 6, 10), a knob band (FIG. 11), a step with a knob band on top, individually mounted knobs, individually mounted elevations or also vortex generators (FIG. 4). Zigzag bands or individually applied jags can be used in different embodiments, e.g. as 60 degree zigzag band or with other angles. As knob band or knobs, conical elevations or elevations in the shape of a truncated cone or a rectangle can be used.

All turbulators, whether 2D or 3D, can be formed as single or multiple elevations. These are advantageously abrupt and sharp-edged. By abrupt it is meant that the difference in height, i.e. the thickness of structure 10, has a flank angle of 45 degrees or more, in particular up to 90 degrees. Sharp-edged means that the edge radius, i.e. the radius between two meeting edges, is considerably smaller than the height difference, i.e. the thickness of structure 10. Advantageously, it is 20% or less of the height difference, especially between 5% and 20%.

In addition, the turbulators may be straight, curved, wave-shaped, interrupted or in a combination thereof and arranged on the antenna housing 100, e.g. at or near edges or on the lid or in an area of the front 101 or side walls.

The size of the turbulators shall be selected in such a way that the antenna characteristics or the radiation of the antenna are not affected and, if possible, the antenna housing is not enlarged. Turbulators with dimensions from one to several tenths of a millimetre up to max. 15 mm can be used.

Microturbulator is the term used to describe structures that essentially have a surface roughness similar to that of the antenna housing. In addition, these structures have a rather irregular granular or scaly pattern, in contrast to turbulators. An example of a microturbulator is sandpaper or a roughened surface of the antenna housing 100. Structures such as shark skin or penguin skin are also called microturbulators.

Structure 10 can also be formed as a turbulator with an additional microturbulator formed thereon, which has a different surface compared to the antenna housing 100.

Other combinations of the described structures 10 or profiles can also be used. The edges can also be formed with changing direction of the edge as a 3D-turbulator in zigzag form, e.g. as a zigzag band. Furthermore, an embodiment with special vortex elements adapted to the respective design is possible, as also shown in FIG. 4. Basically, structure 10 can thus be a jagged structure, which can also be advantageous without connecting peaks between the jagged elements, as shown above all in FIG. 4 (3D-vortex turbulator). The standing, vertical wing elements to the antenna surface have a wedge shape that is favourable to the flow, as shown in FIG. 4. By the height of the step, as well as by the height and/or number of jags, wing elements or knobs, depending on the application, per unit of length or by different angles of the tips of the jags or by special shaping of the vortex elements, the effect of the wind load reduction can be adapted to the field of application for the antenna. This again depends on the shape of the antenna and the structure used.

The described structures 10 are characterized by the fact that they are either applied or arranged directly during the manufacture of the antenna housing 100 or subsequently to precisely defined areas of the antenna housing 100. Thus, the physical effect described above of transforming an essentially laminar flow into a turbulent flow at defined transition areas or locations can be used. Thus, the wind load is reduced and costs are saved, among other things also by the fact that the structure 10 can be formed in such a way that it can be retrofitted to existing antenna housings 100.

This can be done by providing the structure 10 additively, i.e. as a band or individually glued, printed, welded or otherwise attached to the antenna housing 100. The type of attachment depends on the expected external conditions, i.e. where the antenna or the antenna housing 100 is to be mounted. For example, when mounting, use a fastening material suitable for the corresponding conditions, e.g. hot or cold temperatures, large temperature fluctuations, high or very low humidity, high or gusty wind conditions and resulting vibrations or a combination thereof, etc.

Alternatively, structure 10 can be inserted into the antenna housing 100 either subsequently or directly during manufacture by a mechanical or chemical process. This can be done, for example, by having a 2D stage already moulded in the GRP (glass fibre reinforced plastic) pultrusion tool. Alternatively, the structure can also be formed e.g. by demoldable, incorporated 2D and 3D structures in the tool by means of deep drawing, injection molding, etc., or by subsequent shaping by pressing in, pushing in, knurling, as well as subsequently by e.g. milling, eroding, etc.

The shown different structures 10, i.e. directly inserted into the antenna housing 100 or additively applied, continuous, interrupted or also curved, wave-shaped, arched etc. can be used for different applications, e.g. also depending on the expected wind load, the type of installation, i.e. inclined, turned or straight etc.

Basically, turbulators are structures that provide a controlled surface disturbance at a defined area so that an impinging air stream at this area is transformed into a turbulent air stream. Turbulent air streams tend to stay closer to the object being flowed around, so that no or only a much smaller dead water area is created as if no structure 10 is used, which is shown in FIGS. 2a and 2b for comparison. So-called turbulators, in special cases also called vortex generators, can be used as structure 10. Turbulators, for example, are in the form of a zigzag band, e.g. a 60° zigzag band (or also with other angles) or also in the form of a knob band, as described above. Knobs or an increased surface roughness, e.g. a structure such as sandpaper, or just one or more straight, wavy or interrupted edges in the longitudinal direction of the antenna housing 100 can also be used to create the described effect to be achieved.

Figure 10:
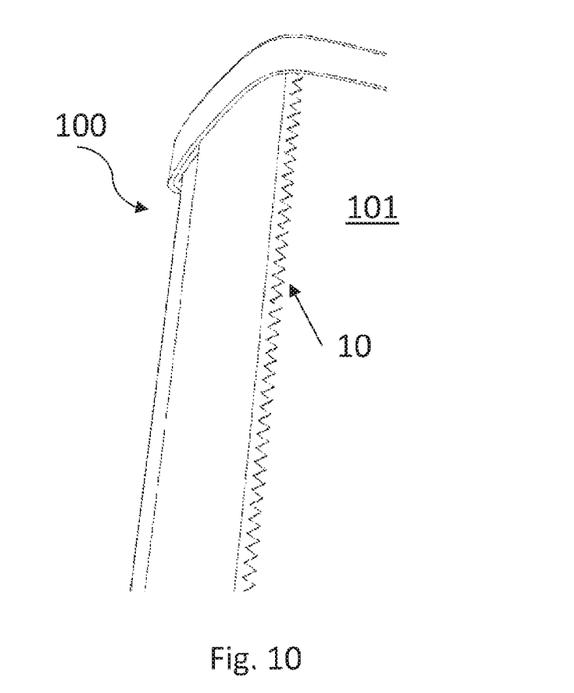
FIG. 10 shows a schematic view of an antenna housing with a structure arranged thereon in a one-sided zigzag shape according to a further embodiment of the present invention.

If structure 10 is applied to a band, especially an adhesive tape, a single-sided zigzag band (triangular shape) can also be chosen as structure 10 to increase the adhesive properties for the zigzag band, as shown in FIG. 10.

Structure 10 can also be used with one side of it as an extension of an edge radius, so that there is no crack or edge between structure 10 and edge, but a flush transition, as shown in FIG. 3. Structure 10, which does not serve as an extension of the edge, should point away from the windward side. The jagged edge therefore faces the wind and falls away after the elevation, which is a difference to the zigzag band. Thus, the active edge, i.e. the transition area, is the (front) surface of the elevation that opposes the flow. This is also true for the embodiment shown in FIG. 10.

The use of several structures 10, which are not arranged on or near the edge, can be advantageous if the antenna housing 100 is exposed to the wind at an angle depending on the wind direction, so that the wind does not hit the front 101 of the antenna housing 100 frontally. Similarly, a curved or wave-shaped structure 10, whether only towards one end, e.g. towards the lid 102, or towards or away from both ends, can be used to create an improvement in reducing the wind load. The radius of the bend in turn depends on the shape and size of the antenna housing 100, the location of the installation, i.e. the place where the antenna is used, and the external factors to be expected.

Furthermore, a structure 10 is provided which is intended for use on antennas or antenna housings 100 and is suitable for achieving the effect described. This structure 10 is adapted to the antenna housing 100 to which it is to be added. The exact shape is selected, as described above, depending on the shape of the antenna housing 100, the place of installation and the expected ambient conditions. Wind tunnel tests or simulations can be used for this purpose. The aim is to provide the structure 10 in such a way that it is applied additively to the antenna housing 100, e.g. by gluing, or is integrated into the antenna housing 100 already during manufacture, and converts the essentially laminar air stream flowing onto it into a turbulent air stream at a point ideal for the application.

The invention claimed is:

1. An antenna housing in the form of a blunt body, wherein the antenna housing has a structure on at least one region which is exposed to an incident flow by an air stream after mounting of the antenna housing, wherein the structure is formed in such a way that it converts the impinging air stream and air stream present at the housing, from a substantially laminar flow into a turbulent flow at a transition region defined by the structure, wherein:
the structure is formed as a turbulator or as a microturbulator or a combination thereof,
the following structure is used as a turbulator: a plurality of adjacent abrupt and sharp-edged elevations with associated edges, wherein the edges point in several directions at an angle to each other, and wherein
the antenna housing substantially has a shape of a cuboid with front, first and second side walls, rear, lid and bottom and edges therebetween with a predetermined edge radius, and the structure is arranged adjacent to or on an edge between two sides.

2. The antenna housing according to claim 1, wherein the structure is formed such that a reduction of the wind load by at least 2% is measurable at least at a predetermined reference value of a speed of an impinging air stream.

3. The antenna housing according to claim 1, wherein the structure is arranged at an area on the antenna housing where the present air stream is slightly before stalling.

4. The antenna housing according to claim 1, wherein the structure is a structure additively applied to the antenna housing or inserted into the antenna housing.

5. The antenna housing according to claim 1, wherein the structure is additionally arranged adjacent between a side and lid and/or between a side and bottom of the cuboid.

6. The antenna housing according to claim 5, wherein the structure is formed and arranged as a continuation of the edge radius of the edge on which it is arranged.

7. The antenna housing according to claim 1, wherein the antenna housing has substantially a shape of a cuboid with front side, first and second side walls, rear side, lid and bottom, and edges therebetween with a predetermined edge radius, and wherein the structure is arranged in an area spaced from an edge between two sides or one side and lid or bottom.

8. The antenna housing according to claim 1, wherein the structure is formed continuously or at least once interrupted over the whole or a predetermined length of the area where it is arranged, and/or wherein the structure is rectilinear or wave-shaped or arcuate along an edge of the antenna housing.

9. A structure for mounting on an antenna housing according to claim 1, wherein the structure is formed so that it can be subsequently applied, in particular glued, to the antenna housing.

* * * * *